United States Patent
Wilmanns

[11] 3,812,596
[45] May 28, 1974

[54] CONTROL AND MONITORING OF PROCESSES IN DEPENDENCE ON THE VAPOR PRESSURE

[75] Inventor: Ingo Wilmanns, Bruhl, Germany

[73] Assignee: Leybold-Heraeus-Verwaltung GmbH, Cologne-Bayental, Germany

[22] Filed: Feb. 1, 1972

[21] Appl. No.: 222,638

[30] Foreign Application Priority Data
Feb. 1, 1971 Germany............................ 2104499

[52] U.S. Cl. ..................................... 34/51, 73/17 A
[51] Int. Cl. ............................................ F26b 21/10
[58] Field of Search....... 34/15, 51; 62/140; 73/398, 73/336.5, 17 A; 250/227; 350/296

[56] References Cited
UNITED STATES PATENTS

| | | | |
|---|---|---|---|
| 1,698,905 | 1/1929 | Beechlyn ............................ | 350/296 |
| 3,166,928 | 1/1965 | Jackson et al. ..................... | 73/17 A |
| 3,252,319 | 5/1966 | Wood et al. ........................ | 73/17 A |
| 3,483,389 | 12/1969 | Cronin ....................... | 250/227 X |

*Primary Examiner*—William E. Wayner
*Attorney, Agent, or Firm*—Spencer & Kaye

[57] ABSTRACT

For controlling and monitoring processes in dependence on vapor pressure, the light reflection from a surface, set to a given temperature in the range of the beginning condensation of the vapor, is measured and then the change in the light reflection is utilized as a control value.

7 Claims, 2 Drawing Figures

CONTROL AND MONITORING OF PROCESSES IN DEPENDENCE ON THE VAPOR PRESSURE

BACKGROUND OF THE INVENTION

The present invention relates to a method and apparatus for controlling and monitoring certain processes, particularly in freeze-drying, in which the control and monitoring function depends on vapor pressure.

For controlling or monitoring of processes in which the partial pressure of vapors is involved, as for example, in freeze-drying processes, and where the control takes place in dependence on the partial pressure of the solvent vapor, pressure gauges, operating according to the Pirani or heat conduction method, or ionization manometers have been used.

Pressure gauges operating according to the Pirani principle, however, can be used only in a limited pressure range. For pressure conditions below $10^{-2}$ Torr (1 Torr $\approx$ 1mm Hg) or above several Torr this type of pressure gauges can not be used.

Ionization manometers can be used only at a pressure below $10^{-3}$ Torr and at pressures above $10^{-3}$ Torr an additional pressure reducer must always be provided. Moreover, a pressure measuring system utilizing an ionization manometer is very complicated since means for stabilization of the ion stream, as well as all other voltages and currents required for its operation, including the appropriate control instruments, must be provided. Finally in such a system direct current amplifiers must be used.

SUMMARY OF THE INVENTION

It is therefore an object of the invention to provide a method for controlling and monitoring processes, particularly freeze-drying processes, which avoids the disadvantages of previously used systems and methods.

It is a further object of the invention to provide a method for controlling and monitoring such processes in which the method is applicable over all pressure ranges encountered in the processes.

It is another object of the invention to provide relatively inexpensive apparatus for carrying out the method of the invention.

Generally, this is accomplished according to the present invention in that the light reflection from a surface which is at the start of operation set to a given temperature in the range of the beginning of condensation, is measured and thereafter the measured change in this light reflection serves as the control value. This procedure permits the controlling and/or monitoring of processes which operate in dependence on vapor pressure in a simple manner and independently of the ambient pressure.

It is advantageous within the scope of the present invention for the reflecting surface to initially be cooler than the temperature to be set and through subsequent heating for it to be set to a temperature which effects a sufficient change in the degree of reflection. This initial cooling serves to overcome the condensation delay which would otherwise be encountered.

The apparatus for accomplishing the method preferably includes a mirror, with an associated heat exchanging device, and the mirror is disposed in the vapor chamber used in the process which is to be controlled or monitored. Optical radiation from a light source is directed onto the mirror surface and the reflected radiation is detected by a photo-electric radiation receiver.

It will be appreciated that, depending on the temperature of the mirror surface and the vapor pressure in the vapor chamber the mirror surface will be covered with condensate to a greater or lesser degree. Therefore the degree to which the impinging light will be reflected depends on the amount of condensate covering. A change in the light reflection is sensed by the radiation receiver and the resulting indication of this change can be used as a control value for the monitoring or control of the process.

If the light source, preferably a luminescent diode, is operated with alternating current, a suitable photoreceiver, preferably a photodiode with an A.C. amplifier connected thereto, can substantially suppress the influence of external stray light radiation.

It is particularly advantageous for the reflecting surface to be the concave surface of a curved mirror. The light source and receiver can then be arranged in conjugated positions with respect to one another so that the hollow mirror acts as an optical reproducing system over its substantially entire surface.

It is also possible to arrange the light source and the light receiver at locations remote from the reflecting surface of the hollow mirror and to connect the light source and the light receiver, via light conductors with conjugated image points of the hollow mirror.

Finally it is possible to use a fluorescent light source so that the system is able to discriminate between fluorescent and nonfluorescent light sources.

DESCRIPTION OF THE PREFERRED EMBODIMENTS

Figure 1:
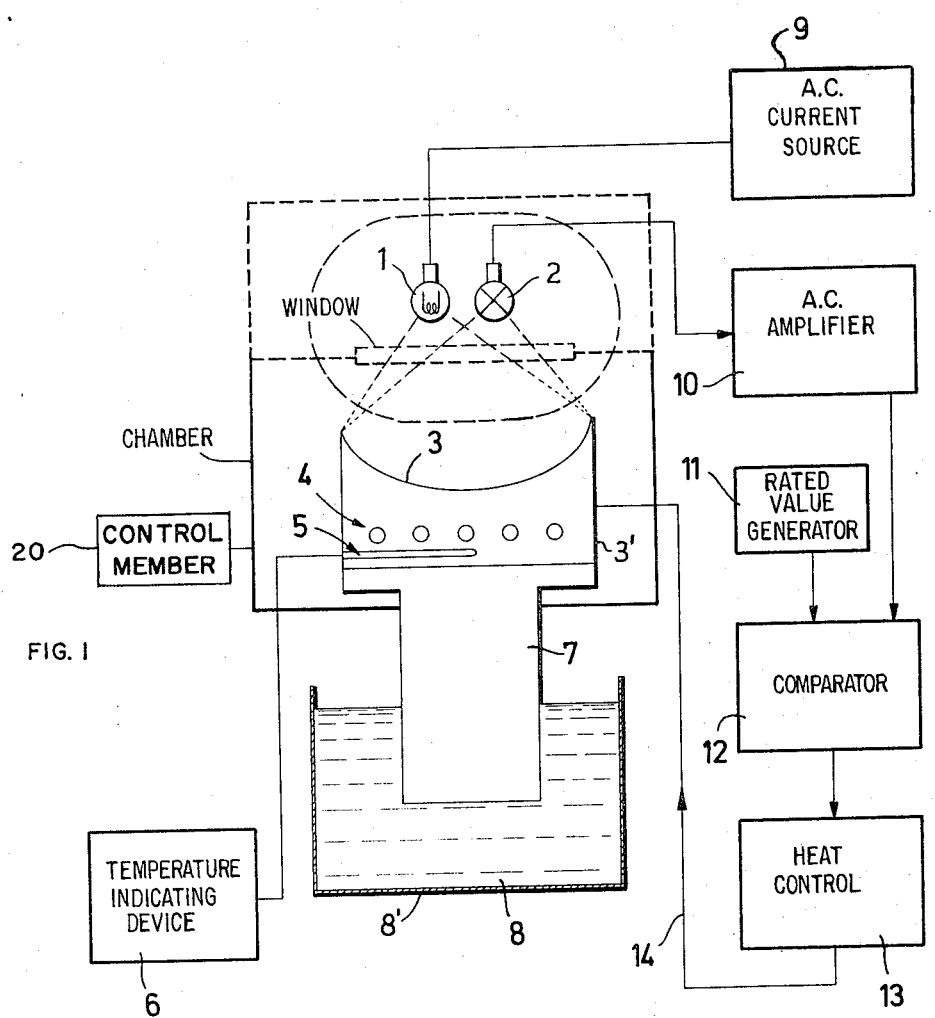
FIG. 1 is a partly cross-sectional and partly schematic illustration of one preferred embodiment of the present invention.

As seen in FIG. 1 of the drawing, the apparatus according to the invention includes certain physical components which are connected to suitable electronic circuits, the latter being shown in block form, since they can be constituted by conventional, commercially available and basic electronic devices.

The light source 1, preferably a luminescence diode, is supplied with alternating current from a suitable current source 9. As this type of source is well known in the art, it is not necessary to describe it in further detail.

A light receiver 2, which can be a suitable photoelectric receiver, preferably a photodiode, is operatively positioned with respect to the light source 1 and is connected to an A.C. amplifier 10, shown in block form. This amplifier can be a known design to deliver a rectified signal and is not shown in detail.

The alternating current from source 9 can serve, or be modulated to serve, to modulate the light from source 1 and amplifier 10 can then be constructed to respond selectively to the correspondingly modulated output from receiver 2 while rejecting all other output components. Similarly, source 1 can be a fluorescent light source and receiver 2 an element which responds selectively essentially only to flourescent light. Devices and circuits for achieving operations of these types are quite well known in the art.

The light source 1 and light receiver 2 are disposed above the concave mirror surface 3 of the hollow mirror mounted on a support portion 3'. The dashed lines indicate the optical reproducing system involved when the light source and the receiver are arranged in conjugated position with respect to one another.

Within the support portion 3' there is heating means, generally indicated at 4, which can be of desired construction and of known elements and therefore it is believed it is not necessary to show such means in detail. Utilizing such heating means the mirror surface 3 can be heated as desired. A thermometer, generally shown at 5, is disposed in the support portion 3' and is connected to a suitable temperature indicating device 6, which can be of well-known construction.

In addition to the heating means 4, a means for cooling the support portion 3' and concave mirror surface 3 is also provided. A sensor portion 7, extending from support portion 3', is received in a cooling liquid 8, held in a container 8'. This cooling liquid is cooled by suitable means not shown and its temperature can be adjusted or varied in any desired manner.

Figure 2:
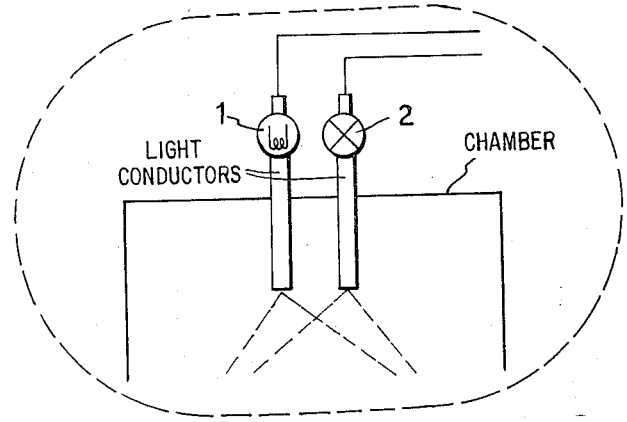
FIG. 2 is a detail view of a modified portion of the embodiment shown in FIG. 1.

While, as seen in FIG. 1 of the drawing in dashed lines, the light source and light receiver can be positioned within the vapor chamber, it is also possible to have these positioned outside of the vapor chamber as also shown in FIG. 2.

It is also possible to arrange the light source and the light receiver at locations remote from the reflecting surface of the hollow mirror and to connect the light source and the light receiver, via light conductors with conjugated image points of the hollow mirror. This arrangement is shown encircled with dashed lines in FIG. 2.

The control system according to the invention functions through a comparator 12. It will be observed that this comparator receives input signals from amplifier 10 and a rated value generator 11. The signal from amplifier 10 is a rectified signal and the rated value generator delivers a signal whose value is selected in a known manner. The comparison signal from comparator 12 is fed to a heat control means 13, such as a thermostat, which is in operative controlling communication with the heating means 4 through connection 14.

Measurements which depend on the partial pressure of the solvent to be sublimed can be effected by measuring the temperature of the mirror with thermometer 5 and varying that temperature to maintain a certain degree of reflection. Then, the measured temperature is a direct function of the partial pressure and the system output is provided by device 6. In response to the conditions existing within the chamber, as determined by the monitoring system, the temperature and pressure conditions are regulated through the control member 20.

During longer periods of process monitoring the mirror surface 3 may also be freed of condensate at certain intervals according to a preferably preselected time program and may then be recovered in the manner indicated above.

According to an alternative procedure a freeze-drying process can be controlled, in dependence on the partial pressure of the subliming, frozen solvent, by holding the temperature of the mirror surface 3 to a constant value which corresponds to this partial pressure and controlling the energy input to the material to be dried so that the degree of reflection remains constant. In this case the illustrated circuit could be modified by connecting the input of heat control 13 to the output of temperature indicating device 6 and connecting the output of comparator 12 to control the energy input to the material to be dried.

It will be understood that the above description of the present invention is susceptible to various modifications, changes and adaptations, and the same are intended to be comprehended within the meaning and range of equivalents of the appended claims.

I claim:

1. Apparatus for monitoring the operation of a freeze-drying process in dependence on the vapor pressure of a vapor, comprising in combination:
   a. a chamber in which the freeze-drying process is performed and containing such vapor;
   b. a mirror with a light reflecting surface disposed in said chamber;
   c. heat exchange means operatively associated with said mirror for controlling its temperature;
   d. a light source disposed for directing visible radiation onto the light reflecting surface of said mirror;
   e. a photo-electric radiation receiver disposed in a position to determine the reflected radiation from said mirror whereby the light reflected from the surface of the mirror, which is set to a given temperature in the range of the beginning condensation of the vapor, is measured and the change in the light reflected serves as a process condition value;
   f. an amplifier connected to said receiver;
   g. a rated value generator;
   h. a comparator connected to receive input signals from said amplifier and said rated value generator;
   i. heat control means connected to receive an output signal from said comparator and, in response thereto, to deliver a command signal to said heat exchange means; and
   j. temperature indicating means associated with said heat exchange means.

2. An arrangement as defined in claim 1, wherein said light source radiates modulated light and said receiver comprises means for separating the reflected modulated light component from stray optical radiation.

3. An arrangement as in claim 1, wherein said mirror is a hollow mirror.

4. An arrangement as in claim 3, wherein said light source and said receiver are disposed outside the chamber and are connected with their respective conjugated image points, relative to the reflecting surface of said mirror, by means of light conductors.

5. An arrangement as defined in claim 1, wherein said light source is a fluorescent light.

6. An arrangement as defined in claim 1 wherein the monitoring apparatus is utilized for controlling a freeze drying process.

7. An arrangement as defined in claim 1 wherein, prior to the production of a measurement by said receiver, said reflecting surface is first cooled below the temperature at which it is to be placed and then permitted to rise to the given temperature by subsequent heating by said heat exchange means.

* * * * *